United States Patent [19]
Mayne

[11] Patent Number: 5,478,041
[45] Date of Patent: * Dec. 26, 1995

[54] CLAMPING AND HOLDING DEVICE

[75] Inventor: Richard C. Mayne, Kingston, Canada

[73] Assignee: Manova Products Inc., Canada

[ * ] Notice: The portion of the term of this patent subsequent to Sep. 6, 2011, has been disclaimed.

[21] Appl. No.: 163,947

[22] Filed: Dec. 8, 1993

Related U.S. Application Data

[63] Continuation-in-part of Ser. No. 988,210, Dec. 9, 1992, Pat. No. 5,344,115.

[30] Foreign Application Priority Data

Aug. 14, 1993 [CA] Canada .................................. 2076202

[51] Int. Cl.⁶ ...................................... A47G 25/12
[52] U.S. Cl. ...................... 248/514; 248/534; 248/314; 248/231.51; 403/104
[58] Field of Search ...................... 248/514, 534, 248/225.31, 231.5, 231.6, 231.1, 309.1, 314; 403/104, 106

[56] References Cited

U.S. PATENT DOCUMENTS

| | | |
|---|---|---|
| 595,218 | 12/1897 | Stauffer . |
| 1,062,460 | 5/1913 | Hannan . |
| 1,525,515 | 3/1925 | Socha . |
| 1,995,656 | 3/1935 | Stout . |
| 2,093,951 | 9/1937 | Bosket . |
| 2,678,792 | 5/1954 | Gallion et al. . |
| 2,884,213 | 4/1959 | Hiering . |
| 2,905,413 | 9/1959 | Harris . |
| 2,955,793 | 10/1960 | Finley . |
| 2,964,869 | 12/1960 | Berghoff et al. .................. 248/231.5 X |
| 2,994,366 | 8/1961 | Hoch . |
| 3,140,069 | 7/1964 | McBurney et al. . |
| 3,734,439 | 5/1973 | Wintz . |
| 3,792,829 | 2/1974 | Fickett . |
| 4,711,422 | 12/1987 | Ibanez ............................ 248/231.6 X |
| 4,832,299 | 5/1989 | Gorton et al. . |
| 4,852,841 | 8/1989 | Sebring . |
| 4,871,141 | 10/1989 | Chen . |
| 4,901,970 | 2/1990 | Moss et al. . |
| 5,344,115 | 9/1994 | Mayne et al. .................... 248/231.5 X |

FOREIGN PATENT DOCUMENTS

| | | |
|---|---|---|
| 1279860 | 2/1991 | Canada . |
| 1282681 | 4/1991 | Canada . |

*Primary Examiner*—Alvin C. Chin-Shue
*Assistant Examiner*—Derek J. Berger
*Attorney, Agent, or Firm*—Robert M. Phipps

[57] ABSTRACT

This invention relates to a clamping and holding device and more particularly to a clamping and holding device which can be attached to articles such as patio chairs to mount a holder for umbrellas and the like in a variety of positions. The device provides a first clamping arm and a second clamping arm pivotally connected to one another to engage an article. A holder extending laterally from the first clamping arm is provided to hold a tray, umbrella or the like. The holder may be locked in a variety of positions. A cam, cam follower and locking member or nut and bolt system prevents the inadvertent opening of the clamping arms.

16 Claims, 9 Drawing Sheets

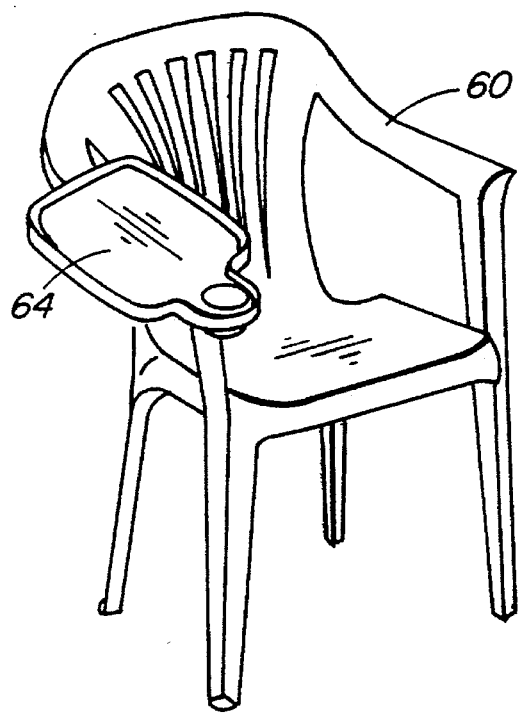
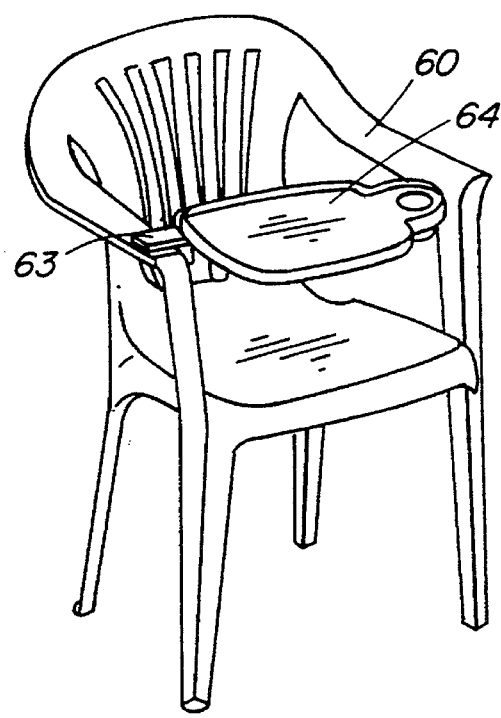
FIG. 8a
FIG. 8c
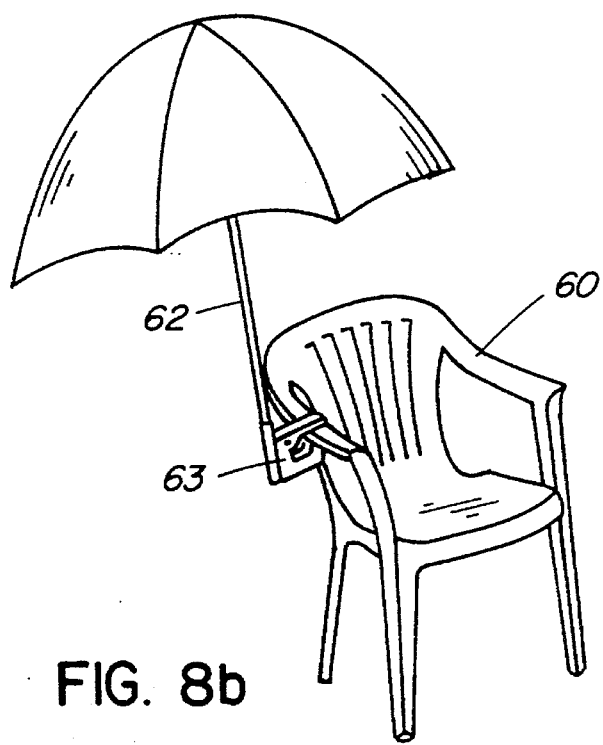
FIG. 8b

CLAMPING AND HOLDING DEVICE

RELATED APPLICATIONS

This application is a continuation-in-part of application Ser. No. 07/988,210 filed Dec. 9, 1992 by Richard Charles Mayne, Laurence Gray and Richard Whyte now U.S. Pat. No. 5,344,115.

FIELD OF THE INVENTION

This invention relates to a clamping and holding device and more particularly to a clamping and holding device which can be attached to articles such as patio chairs to mount a holder for umbrellas and the like in a variety of positions.

BACKGROUND OF THE INVENTION

In the past, there has been a need for a device that conveniently and securely attaches to patio or deck furniture for mounting a variety of accessories, including trays, sunshades and umbrellas. The user of patio or deck furniture, such as chairs or tables usually has need of additional accessories. For example, a person sitting on a patio or deck chair could have need of a tray conveniently located on the chair for placing food or beverages or for an umbrella or sunshade to provide shade from the sun. Modern patio or deck furniture is often designed to stack upon themselves for storage and, therefore, any accessories used with the furniture should be readily removable so as not to interfere with such abilities.

Clamps in the past have not provided an effective and convenient means of attaching these various accessories to patio or deck furniture.

Canadian Patent 1,279,860 discloses a spring biased cam-type medical accessory post clamp for mounting a housing on an elongated supporting member. It does not permit attachment to the variety of surfaces as are found on patio or deck furniture.

Canadian Patent 1,282,681 discloses a latching assembly for releasably attaching a vehicle seat to a vehicle body. This device, similarly, does not permit attachment to the variety of surfaces found on patio or deck furniture.

U.S. Pat. No. 4,852,841 discloses a device for clamping the edge of a table. The clamping action of this device is actuated by a lever which serves to move a clamping surface closer to a second clamping surface. This device, similarly, does not permit attachment to the variety of surfaces found on patio or deck furniture.

Other patents of interest relating to clamping and holding devices are U.S. Pat. No. 2,093,951, U.S. Pat. No. 2,905,413, U.S. Pat. No. 2,884,213, U.S. Pat. No. 3,140,069, and U.S. Pat. No. 3,792,829.

It is, therefore, an object of this invention is to provide a holder of the type described which is convenient to use and which will securely hold the umbrella or other article in the holder in a variety of positions. It is of particular importance that the holder be held firmly when the umbrella or similar article is inclined because of the leverage exerted when the umbrella is not in a vertical position.

It is also an objective to provide a clamping and holding device which can easily and conveniently be attached to an article of furniture such as patio furniture and in which the angle of inclination of the holder can also readily be adjusted.

SUMMARY OF THE INVENTION

In accordance with one aspect of this invention, there is provided a clamping and holding device comprising a first clamping arm and a second clamping arm pivotally connected to the first clamping arm for cooperation with the first clamping arm to engage an article upon which the clamping and holding device is to be mounted. A holder extending laterally from the first clamping arm has a first position for permitting pivotal movement of the holder with respect to the first clamping arm and a second position where the holder is locked to prevent pivotal movement of the holder with respect to the first clamping arm. A locking means is provided for selectively inhibiting pivotal movement of the first clamping arm with respect to the second clamping arm from a closed position, the locking means including a cam on the second clamping arm and a cam follower at a first end of the first clamping arm to cooperate with the cam to bias the second clamping arm to the closed position.

In accordance with another embodiment of the invention, the device is provided with a locking member on the first clamping arm for engagement with the second clamping arm when the second clamping arm is in the closed position, the locking member to prevent inadvertent opening of the second clamping arm from the closed position.

In accordance with another embodiment of the invention, there is provided a clamping and holding device comprising a first clamping arm and a second clamping arm pivotally connected to the first clamping arm for cooperation with the first clamping arm to engage an article upon which the clamping and holding device is to be mounted. A holder extending laterally from the first clamping arm is also provided, the holder having a first position permitting pivotal movement of the holder with respect to the first clamping arm and a second position in which the holder is locked to prevent pivotal movement of the holder with respect to the first clamping arm. A locking means is also provided for selectively inhibiting pivotal movement of the first clamping arm with respect to the second clamping arm from a closed position, the locking means including a nut and a bolt extending through the first and second clamping arms.

In accordance with another embodiment of the invention, there is provided a clamping and holding device where the first clamping arm is provided with a channel to enable the bolt to pass through the first clamping arm in an arc as the second clamping arm is moved from the closed position.

BRIEF DESCRIPTION OF THE DRAWINGS

These and other features of the invention will become more apparent from the following description in which reference is made to the appended drawings wherein:

FIG. 8a is a perspective view of a tray mounted on a chair by a clamp in accordance with the invention;

FIG. 8b is a perspective view of an umbrella mounted on a chair by a/clamp in accordance with the invention;

FIG. 8c is a perspective view of a tray mounted on a chair in a different orientation to that of FIG. 8a in accordance with the invention;

DETAILED DESCRIPTION OF THE PREFERRED EMBODIMENT

Figure 1:
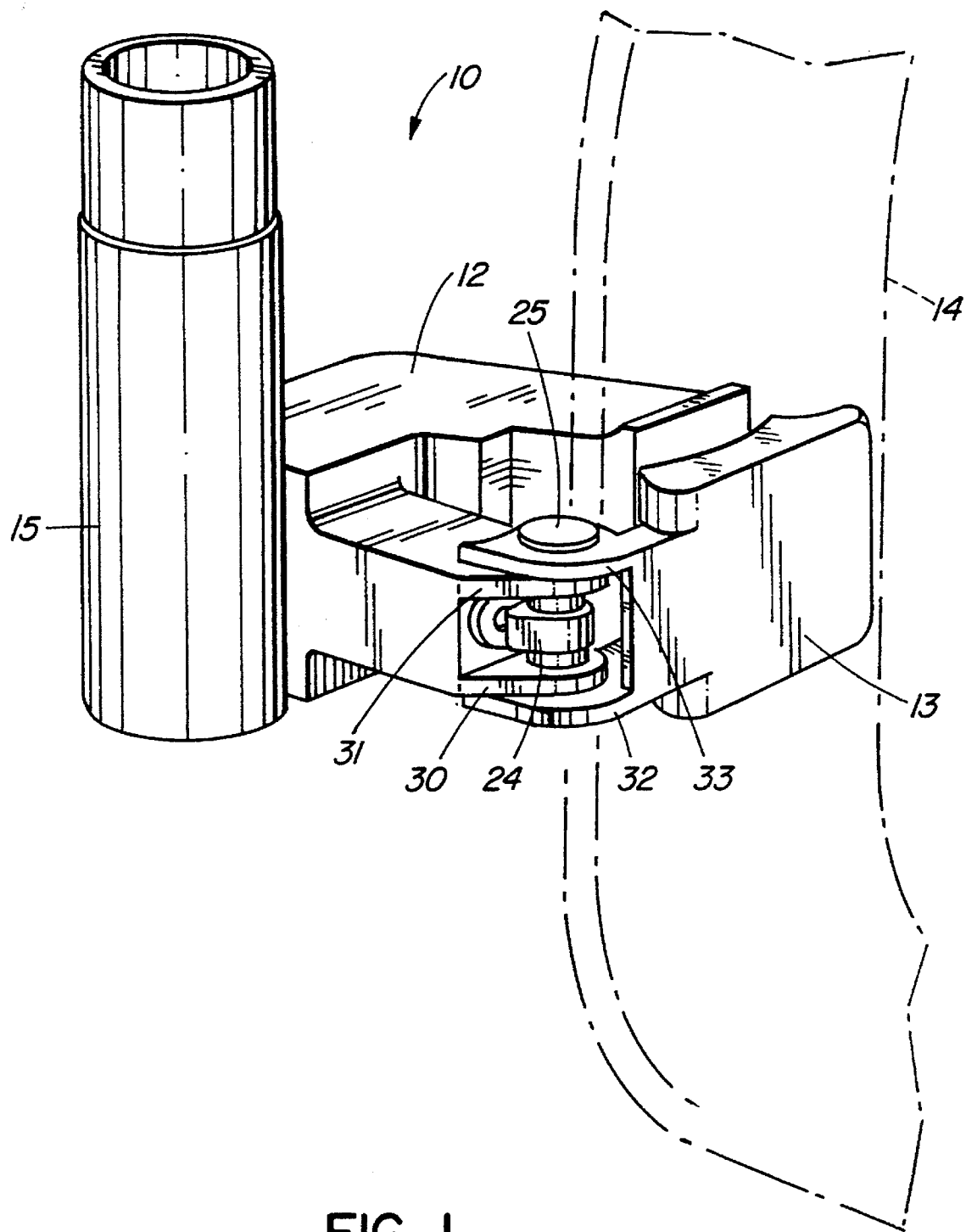
FIG. 1 is a perspective view of a clamping and holding device in accordance with this invention.

Referring now to the drawings, FIG. 1 illustrates a clamping and holding device 10 comprising a first clamping arm 12 with a general C shape. A second clamping arm 13 is pivotally mounted at one end of the first clamping arm 12. Clamping arms 12 and 13 cooperate to engage an article upon which the clamping and holding device is to be mounted, such as for example, a section of an arm of a lawn chair illustrated at 14.

Figure 2:
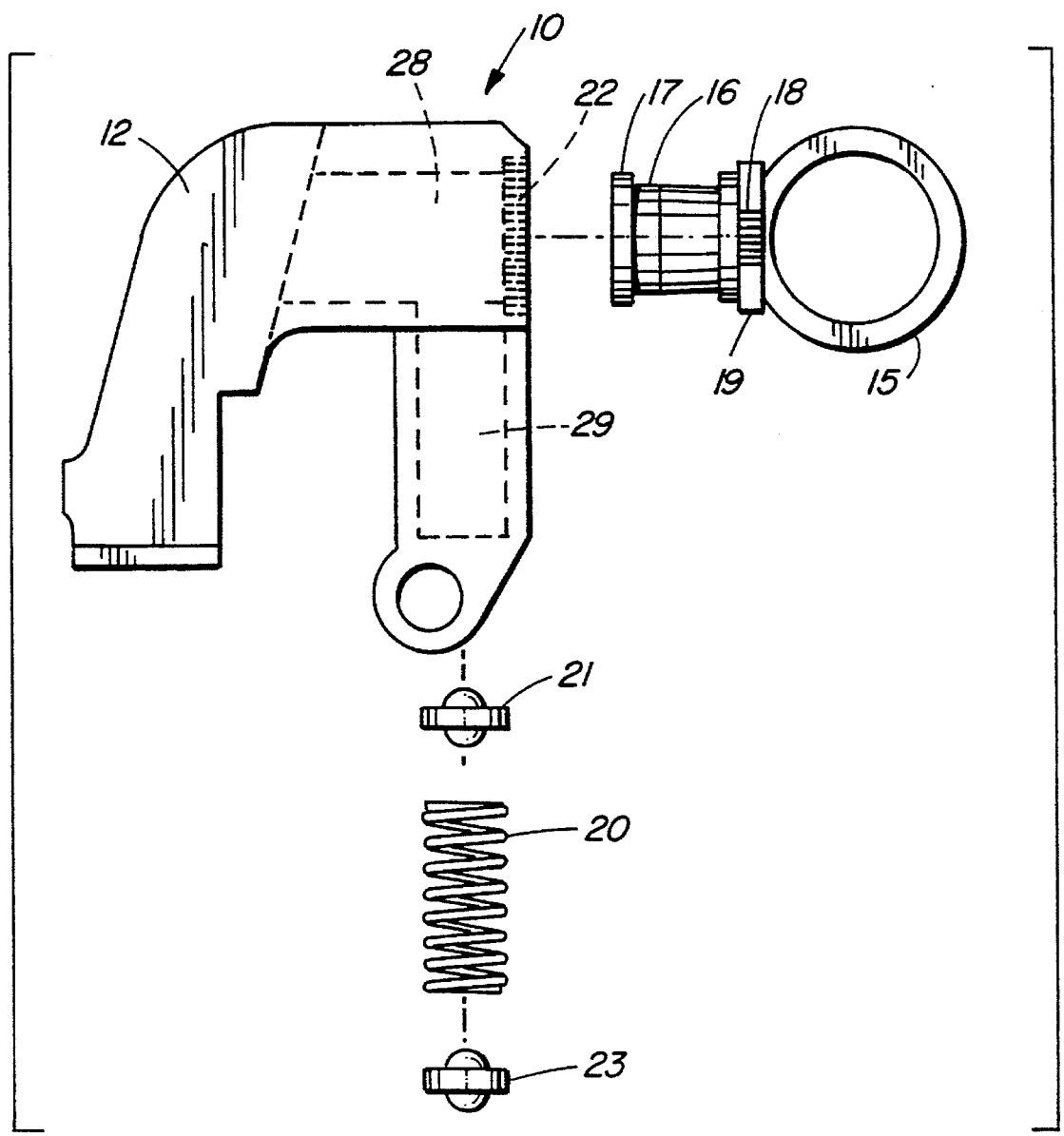
FIG. 2 is an exploded plan view of part of the clamping and holding device of FIG. 1.
Figure 3:
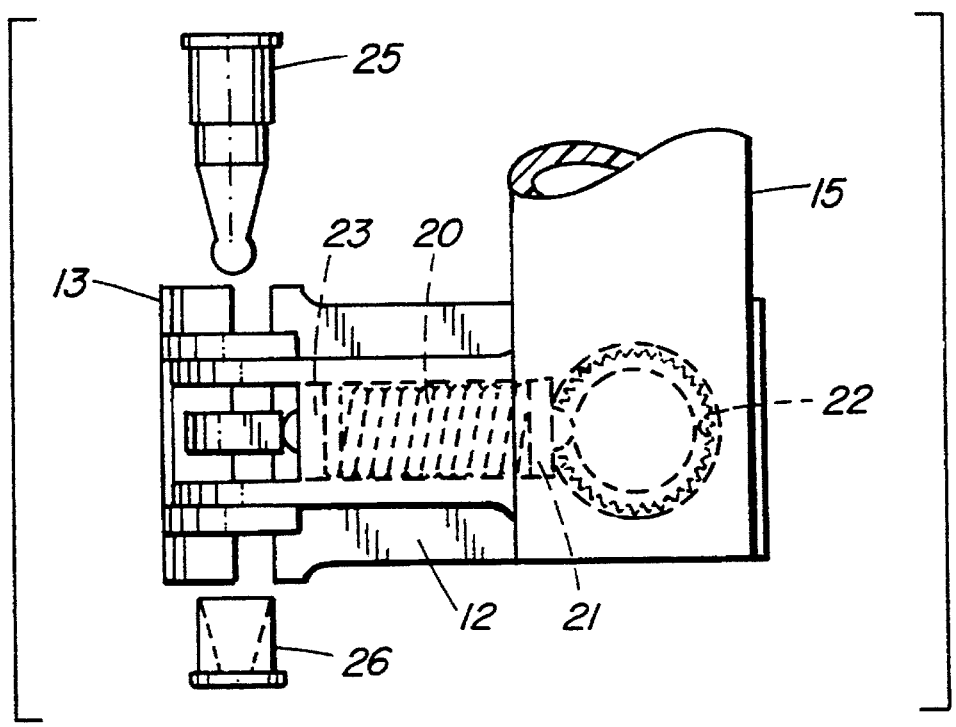
FIG. 3 is an exploded end elevation view of the clamping and holding device in FIG. 1.
Figure 4:
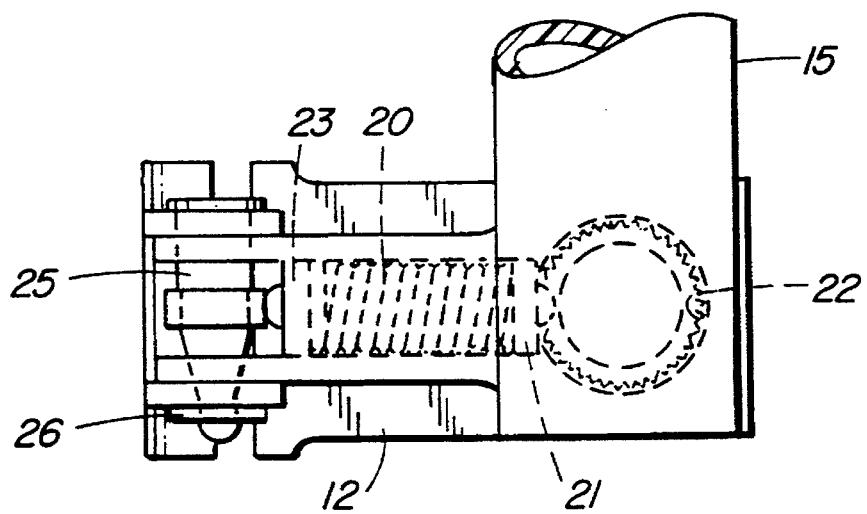
FIG. 4 is an elevation view corresponding to FIG. 3 but showing the components assembled.
Figure 5:
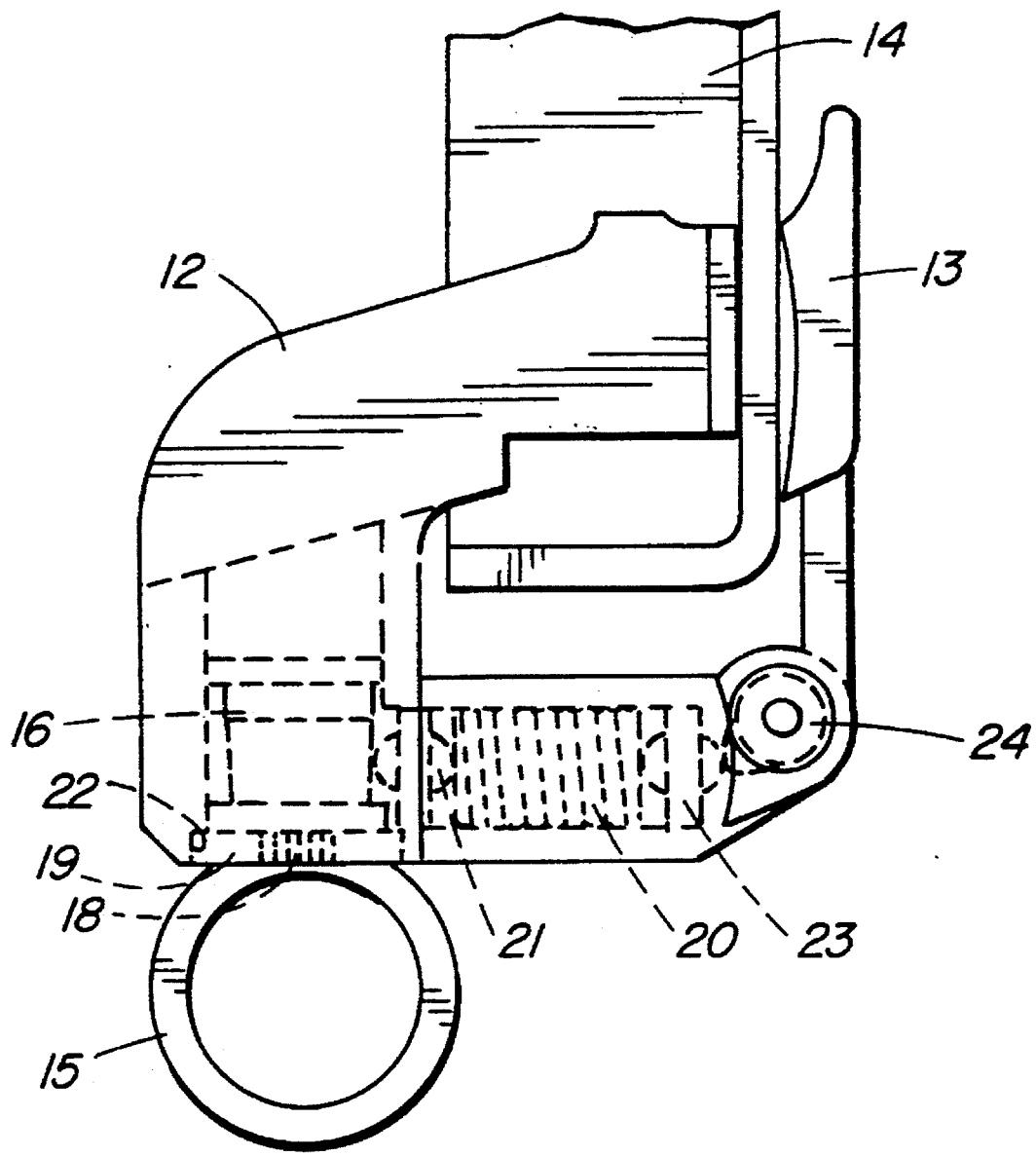
FIG. 5 is a plan view of the clamping and holding device in accordance with FIG. 1.

A holder 15 which may be in form of a tube with an interior diameter of about one inch is mounted on the first clamping arm 12 to extend laterally from the first clamping arm 12. As shown in FIG. 2, holder 15 is mounted for pivotal movement about a horizontal axis transverse to the clamping arms 12 and 13. As shown in FIG. 2, holder 15 has a mounting portion 16 which is conical with the smaller diameter close to holder 15. A retaining lip 17 is at the far end of mounting 16 to prevent it from being fully retracted from the first clamping arm 12. A serrated collar 18 is also provided having teeth 19 to permit the holder to be locked firmly in position at a variety of different angles. Upon assembly of holder 15 with main body 10 as shown in FIGS. 3, 4 and 5, a compression spring 20 urges locking button 21 against conically shaped mounting 16 to urge teeth 19 into engagement with teeth 22 in first clamping arm 12. This structure provides a firm engagement between the holder 15 and the first clamping arm 12 at a variety of positions. However, the angular position of holder 15 can readily be adjusted by pulling holder 15 out in a downward direction with respect to FIG. 5 to disengage teeth 19 and 22 and permit pivotal rotation.

A locking button 23 is also controlled by spring 20 and it provides a cam follower for engagement with a cam 24 shown in FIG. 5. Cam 24 is secured in position within clamping arm 13 by pin 25 which engages locking button 26. The interaction of cam 24 and cam follower 23 causes clamping arm 13 to be biased into a closed position to hold the article of furniture such as 14 between the clamping arms 12 and 13.

Figure 12:
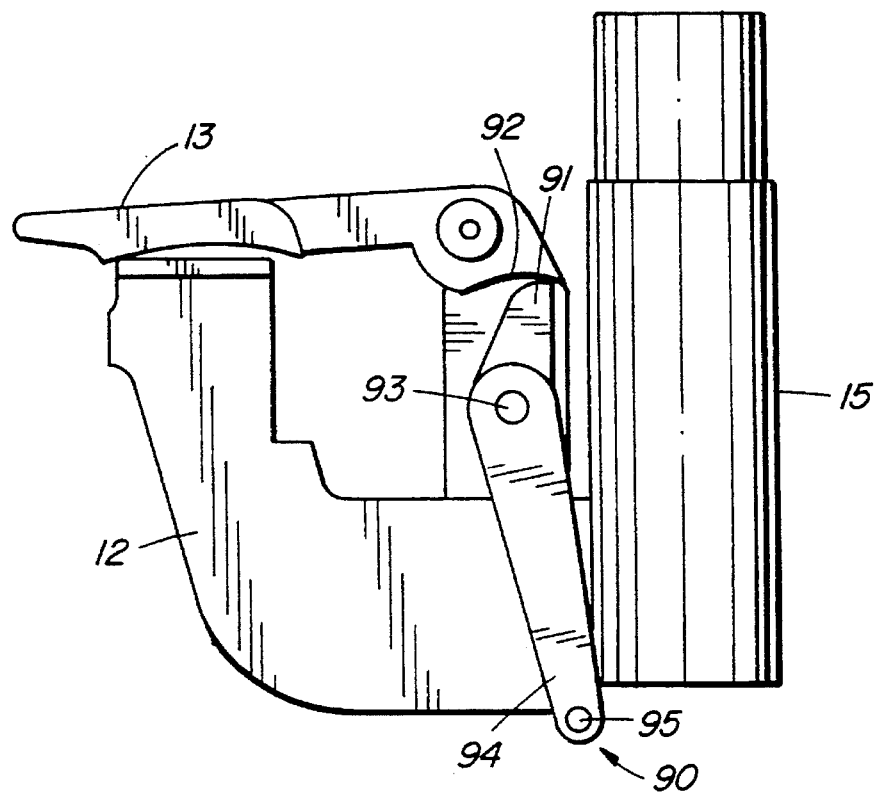
FIG. 12 is a plan view of an alternate embodiment of the invention showing a locking arm.

A locking arm 90 may also be pivotally mounted on the first clamping arm 12 to prevent inadvertent opening of the second clamping arm 13 from the closed position as shown in FIG. 12. The locking arm 90 is provided with an engagement member 91 which engages with an engagement surface 92 on second clamping arm 13, a locking arm pivot 93 and pivot arm 94 with arresting pin 95. When the second clamping arm 13 is in the closed position, the locking arm 90 may be pivoted about pivot point 93 in order that engagement member 91 engages with engagement surface 92 in order to prevent pivotal movement of second clamping arm 13. When engagement member 91 is moved away from engagement surface 92 by movement of pivot member 94, arresting pin 95 limits the range of motion of the pivot member 94.

Assembly is achieved in accordance with the following:

1) Insert holder 15 into a hole 28 in first clamping arm 12;
2) Insert locking button 21 into the bore 29 of first clamping arm 12;
3) Insert spring 20 into first clamping arm 12 ensuring that it seats over locking button 21;
4) Insert locking button 23 into bore 29 ensuring that the button 23 seats into spring 20;
5) Position clamping arm 13 over projecting legs 30 and 31 in first clamping arm 12 and slide pin 25 through the arms 32 and 33 of clamp 13 and one leg 31 of first clamping arm 12 and cam 24 ensuring that the cam face is in alignment with locking button 23;
6) Position locking cap 26 through arm 32 of clamp arm 13 and bottom leg 30 of body 11, pressing pin 25 and locking cap 26 together until the pin 25 locks into the locking cap 26.

Figure 6:
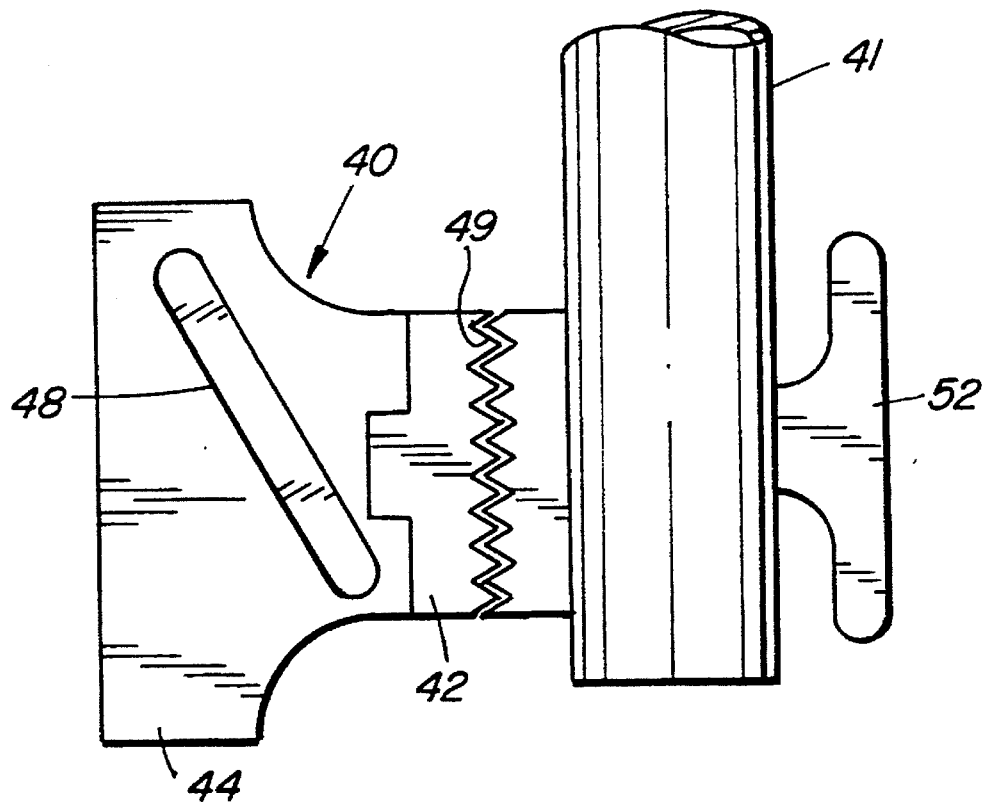
FIG. 6 is a side elevation view of a clamping and holding device in accordance with an alternative embodiment.
Figure 7:
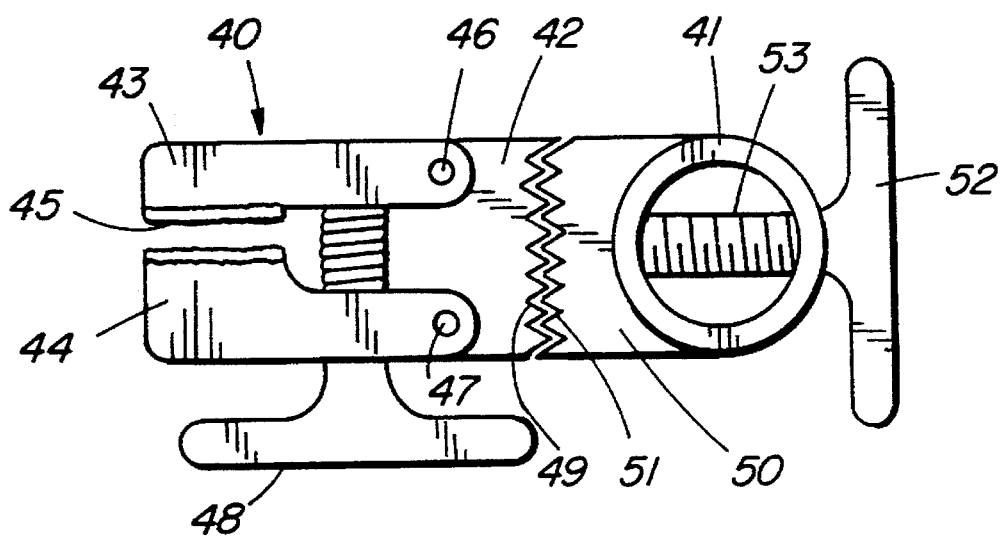
FIG. 7 is an plan view of the device of FIG. 8.

FIGS. 6 and 7 illustrate an alternative embodiment of this invention in which there are two sections, a clamping section 40 and a holding section 41. The clamping section 40 comprises a body 42 to which is pivotally secured jaws 43 and 44 which preferably are faced with rubber or similar material as shown at 45. Pivot pins 46 and 47 permit the jaws to pivot. A wing nut 48 threadably engages jaws 43 and 44 to clamp the device to an article of furniture. The first section also comprises serrated teeth 49.

The second section includes holder 41 which is mounted on body 50 having teeth 51 to engage teeth 49. A wing nut 52 is mounted on threaded shaft 53 so as to clamp teeth 49 and 51 into engagement or to permit pivotal movement of section 2 with respect to section 1 about a horizontal axis for a variety of positions of holder 41. In the embodiment illustrated in FIGS. 6 and 7 the umbrella or other article supported by the holder cannot pass through holder 41 because of the location of wing nut 52. This embodiment will therefore be particularly suitable for supporting a tray as illustrated in FIGS. 8(a) or 8(c) but can be used with a small umbrella as shown in FIG. 8(b). It will however be appreciated that if desired holder 41 can be located laterally of the wing nut to permit the shaft of the umbrella to pass unimpeded down through the holder.

Figure 8D:
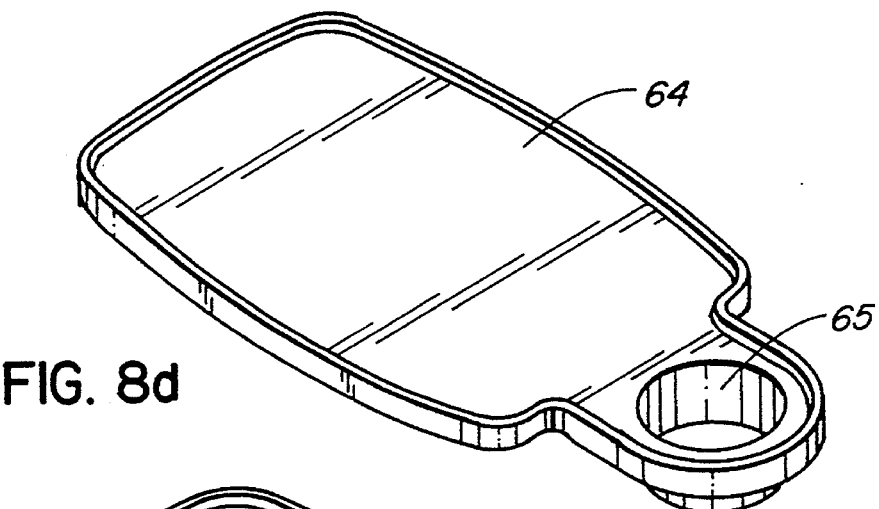
FIG. 8d is a perspective view of the top side of a tray in accordance with the invention.
Figure 8E:
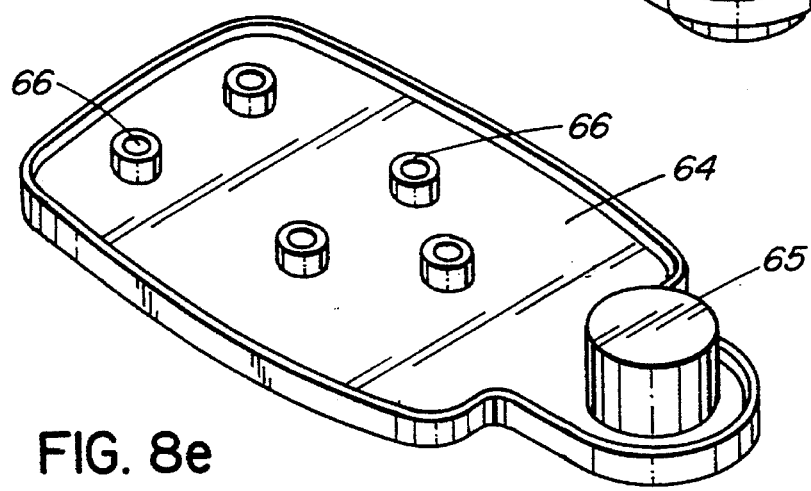
FIG. 8e is a perspective view of the underside of a tray in accordance with the invention.
Figure 8F:
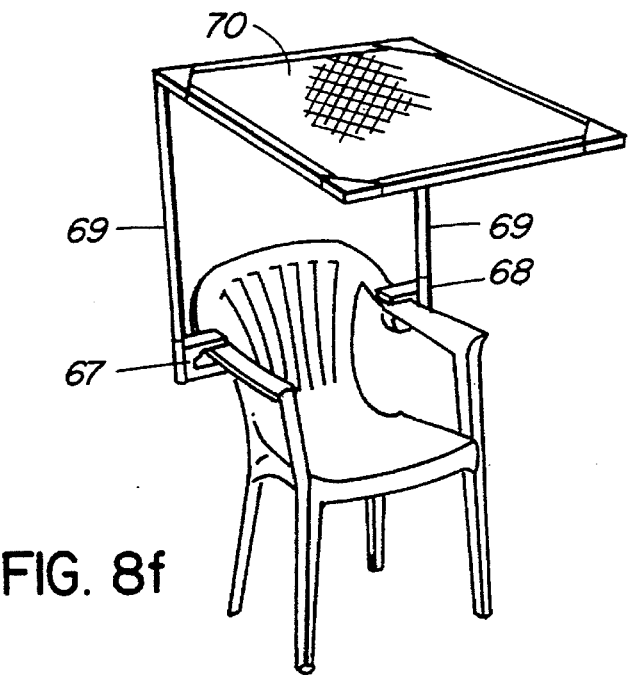
FIG. 8f is a perspective view of an awning mounted on a chair by a clamp in accordance with the invention.
Figure 9:
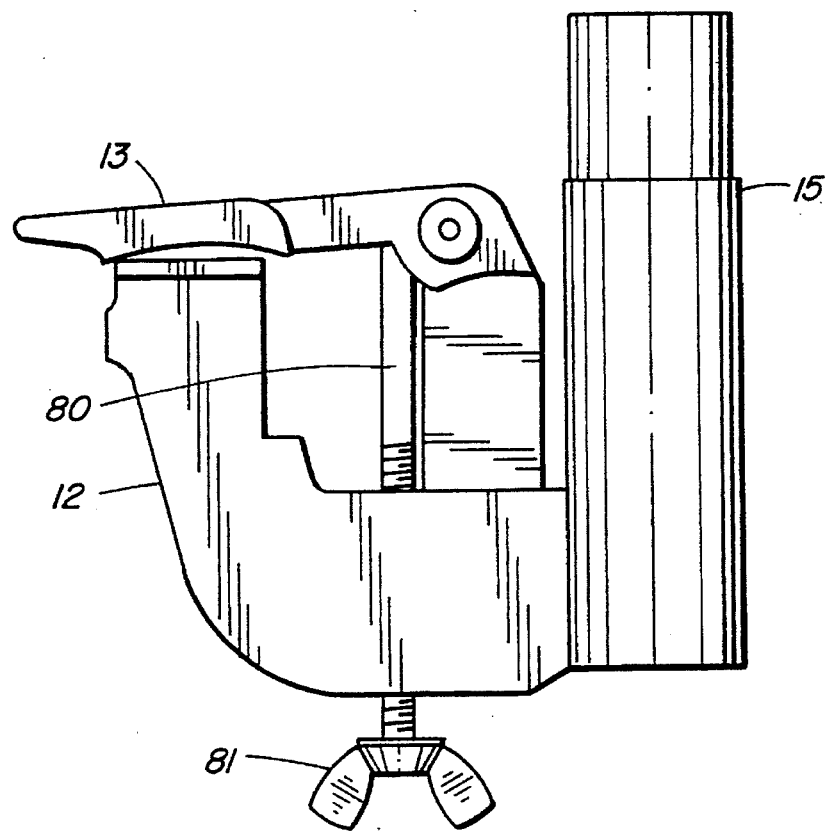
FIG. 9 is a plan view of an alternate embodiment of the invention.
Figure 10:
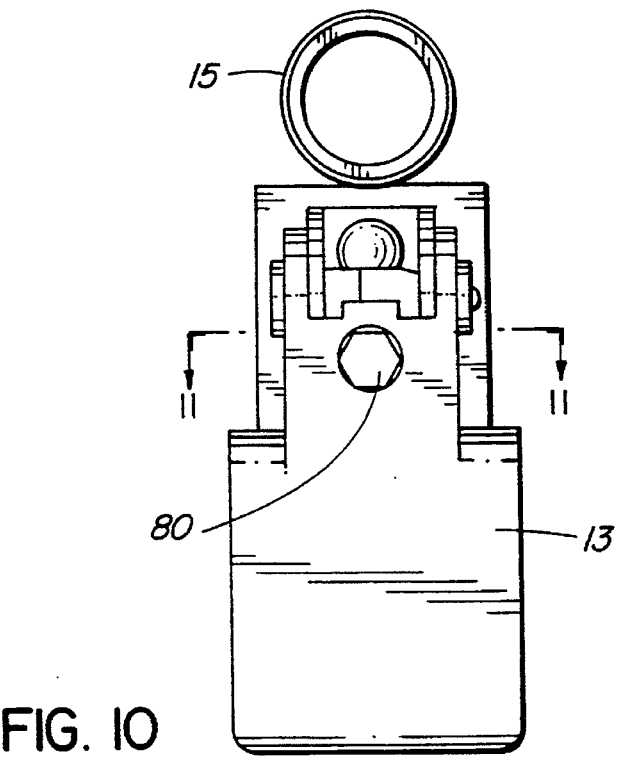
FIG. 10 is an end view of the device of FIG. 9.

FIG. 8 illustrates applications of this invention. In FIG. 8(a) what is known as a "resin" chair 60 has a tray 64 attached to it by a clamp in accordance with this invention. FIG. 8(b) shows a chair 60 to which umbrella shaft 62 has been secured by a clamp 63 in accordance with the invention. FIG. 8(c) shows that tray 64 can be secured to chair 60 in a frontal position by clamp 65. FIG. 8(d) is a detail view of the top side of tray 64 showing a glass holder recess 65. FIG. 8(e) shows the underside of tray 64 including glass holder 65 and a stub 66 to be attached to the holder of a clamp in accordance with the invention. FIG. 8(f) shows a pair of clamps 67 and 68 to be attached to the side of a chair to support rods 69, which in turn support awning 70.

It will be noted from FIG. 8 that a clamping and holding device in accordance with this invention can readily be attached in a variety of locations on the arms or elsewhere of outside furniture of the type illustrated.

Figure 11:
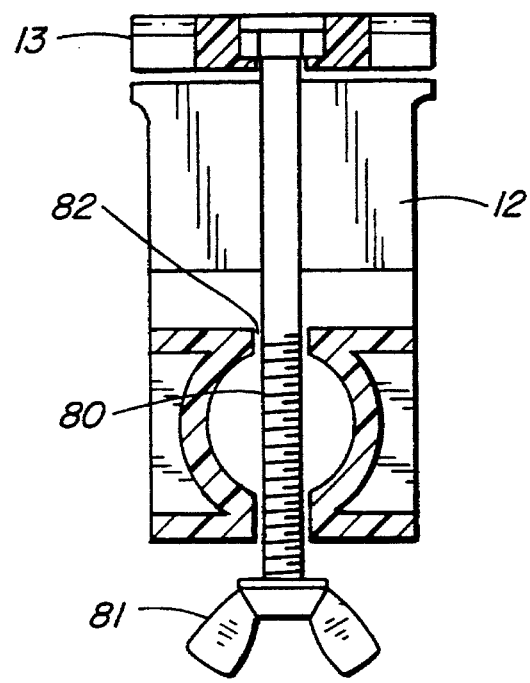
FIG. 11 is cross-sectional of the device of FIG. 9 at line 11—11.

FIG. 11, 12 and 13 show an alternate embodiment of the invention where the second clamping arm 13 is provided with a bolt 80 which extends through channel 82 and the first clamping arm 12. Pivotal movement of second clamping arm 13 to open the clamp causes the bolt 80 to move through channel 82, thereby enabling an opening of typically 45°. A wing nut may be threadably engaged upon the bolt 80 in order to secure the first clamping arm 12 with respect to the second clamping arm 13.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

I claim:

1. A clamping and holding device comprising a first clamping arm;

a second clamping arm pivotally connected to the first clamping arm for cooperation with the first clamping arm to engage an article upon which the clamping and holding device is to be mounted;

a holder extending laterally from the first clamping arm, said holder having a first position permitting pivotal movement of the holder with respect to the first clamping arm and a second position in which the holder is locked to prevent pivotal movement of the holder with respect to the first clamping arm;

locking means for selectively inhibiting pivotal movement of the first clamping arm with respect to the second clamping arm from a closed position, the locking means including a cam on the second clamping arm and a cam follower on the first clamping arm to cooperate with the cam to bias the second clamping arm to the closed position.

2. A clamping and holding device as in claim 1 where a spring is provided within the first clamping arm to bias the cam follower against the cam.

3. A clamping and holding device as in claim 1 further comprising a locking member on the first clamping arm for engagement with the second clamping arm when the second clamping arm is in the closed position, said locking member to prevent inadvertent opening of the second clamping arm from the closed position.

4. A clamping and holding device as in claim 3 where the locking member pivots with respect to the first clamping arm between an open position and an engaged position where when the locking member is in the open position, the second clamping arm may be moved from the closed position and when the locking member is in the engaged position, the second clamping arm engages with the locking member to prevent the second clamping arm from being moved from the closed position.

5. The clamping and holding device of claim 4, further comprising a tray with at least one underside stub adapted to cooperate with said holder.

6. A clamping and holding device as in claim 1 where the holder and first clamping arm are provided with locking teeth for mutual engagement when the holder is in the second position.

7. A clamping and holding device as in claim 1 in which the holder has a mounting portion with a conically shaped surface with its narrow diameter close to the holder, and the spring is a compression spring extending laterally from the mounting portion, further comprising a locking button, where said compression spring is acting to urge the locking button against the conically shaped surface.

8. A clamping and holding device of claim 1 where the first and second clamping arms are provided with engaging surfaces for cooperation with a flat surface.

9. A clamping and holding device as in claim 1 where the first clamping arm is c-shaped to provide an open orifice between the first and second clamping arms when said arms are in the closed position to enable the clamping and holding device to be mounted around an article.

10. A clamping and holding device comprising a first clamping arm;

a second clamping arm pivotally connected to the first clamping arm for cooperation with the first clamping arm to engage an article upon which the clamping and holding device is to be mounted;

a holder extending laterally from the first clamping arm, said holder having a first position permitting pivotal movement of the holder with respect to the first clamping arm and a second position in which the holder is locked to prevent pivotal movement of the holder with respect to the first clamping arm;

locking means for selectively inhibiting pivotal movement of the first clamping arm with respect to the second clamping arm from a closed position, the locking means including a nut and bolt extending through the first and second clamping arms, wherein the first clamping arm is provided with a channel to enable the bolt to pass through the first clamping arm in an arc as the second clamping arm is moved from the closed position.

11. A clamping and holding device as in claim 10 where the channel enables around 45° of motion of the second clamping arm with respect to the first clamping arm.

12. A clamping and holding device as in claim 10 where the holder and first clamping arm are provided with locking teeth for mutual engagement when the holder is in the second position.

13. A clamping and holding device as in claim 10 in which the holder has a mounting portion with a conically shaped surface with its narrow diameter close to the holder, and the spring is a compression spring extending laterally from the mounting portion and acting to urge a locking button against the conically shaped surface.

14. A clamping and holding device of claim 10 where the first and second clamping arms are provided with engaging surfaces for cooperation with a flat surface.

15. A clamping and holding device as in claim 10 where the first clamping arm is c-shaped to provide an open orifice between the first and second clamping arms when said arms are in the closed position to enable the clamping and holding device to be mounted around an article.

16. A clamping and holding device comprising:

a first clamping arm;

a second clamping arm pivotally connected to the first clamping arm for cooperation with the first clamping arm to engage an article upon which the clamping and holding device is to be mounted;

a holder extending laterally from the first clamping arm with a mounting portion, the mounting portion telescopically received in the first clamping arm, said holder having a first position permitting pivotal movement of the holder and a second position in which the holder is locked to prevent pivotal movement of the holder, the mounting portion also with a conically shaped surface with its narrow diameter close to the holder, a compression spring acting on the mounting portion normally to retain it in the second position extending laterally from the mounting portion and acting to urge a locking button against the conically shaped surface;

a nut and a bolt extending through the first and second clamping arms when the second clamping arm is in the closed position for selectively inhibiting pivotal movement of the first clamping arm with respect to the second clamping arm from a closed position and where the first clamping arm is provided with a channel to enable the bolt to pass through the first clamping arm as the second clamping arm is moved from the closed position.

* * * * *